United States Patent [19]
Sardisco

[11] 3,880,732
[45] Apr. 29, 1975

[54] HYDROMETALLURGICAL PROCESS FOR THE PRODUCTION OF COPPER

[75] Inventor: John B. Sardisco, Shreveport, La.

[73] Assignee: Pennzoil Company, Houston, Tex.

[22] Filed: May 23, 1974

[21] Appl. No.: 472,736

Related U.S. Application Data

[63] Continuation-in-part of Ser. No. 289,980, Sept. 18, 1972, Pat. No. 3,817,743.

[52] U.S. Cl. .................... 204/107; 75/1; 75/101 R; 75/101 BE; 75/114; 75/117; 75/118; 423/557; 423/36; 204/108
[51] Int. Cl. ................. C22d 1/16; C22b 15/00
[58] Field of Search .............. 204/107–108; 75/117–118, 101 R, 101 BE, 114, 72; 423/557, 36

[56] References Cited
UNITED STATES PATENTS

| | | | |
|---|---|---|---|
| 1,833,682 | 11/1931 | Meyer | 75/116 |
| 3,785,944 | 1/1974 | Atwood et al. | 75/117 |
| 3,817,743 | 6/1974 | Sardisco | 75/117 |

*Primary Examiner*—R. L. Andrews
*Attorney, Agent, or Firm*—Larry B. Feldcamp; Delmar L. Sroufe; Frank B. Pugsley

[57] ABSTRACT

An improved process is described for the recovery of metallic copper from sulfur treated copper iron sulfide ore concentrates. X-bornite may be prepared from the chalcopyrite content of such ore concentrates by reacting said concentrates with sulfur vapor for at least about 6 minutes at 460°–500°C and 200 mm to 750 mm of Hg. By recycling the reaction product through the sulfur vapor reactor, residual chalcopyrite can be reduced but the main product of such recycling is idaite instead of x-bornite. In this improvement the sulfur treated ore concentrate is leached with cupric chloride. The pregnant liquor may be diluted with as much as about one part of water to one part of liquor and/or it may be cooled to precipitate cuprous chloride and silver chloride from the liquor. Metallic copper may then be produced from the precipitated cuprous chloride. In a preferred method, the cuprous chloride is reacted with sulfuric acid and $O_2$ at 0–50 psig and 110°–115°C to produce cupric sulfate and hydrogen chloride. This cupric sulfate may be electrolyzed in a conventional cell to produce copper metal at the cathode and sulfuric acid and silver compounds at the anode.

In one mode of practicing the invention, silver is removed from copper chloride liquor which is separated from the precipitated cuprous chloride. In the latter embodiment the liquor is first treated with oxygen to remove iron from the system and to convert the cuprous chloride to cupric chloride. Silver is removed from the resulting solution by anionic ion exchange.

20 Claims, 2 Drawing Figures

HYDROMETALLURGICAL PROCESS FOR THE PRODUCTION OF COPPER

CROSS-REFERENCE TO RELATED APPLICATION

This application is a continuation-in-part of copending application Ser. No. 289,980, filed Sept. 18, 1972 now U.S. Pat. No. 3,817,743.

BACKGROUND OF THE INVENTION

1. Field of The Invention

This invention relates generally to hydrometallurgical processes for the production of metallic copper from copper iron sulfide ore concentrates. In particular, this invention is concerned with the treatment of copper iron sulfides to make the sulfides more responsive to hydrometallurgical processing. In accordance with this invention, chalcopyrite and other copper iron sulfides are first reacted with sulfur vapor to transform the sulfides into other compounds which are thereafter leached with cupric chloride to solubilize the copper content of the ore concentrates. In accord with the improved process of this invention, high grade copper metal may be recovered by processing the resulting copper bearing pregnant liquor.

2. Prior Art

As noted in the above-referenced parent application, chalcopyrite, which is the principal copper sulfide mineral in the United States, has been found to be the most resistant to treatment by hydrometallurgical processes. Processes developed for the treatment of chalcopyrite have been plagued with low recoveries of copper from the ore. Some processes have been able to recover a substantial amount of copper in the ore but only after the leaching operation has been carried on for a number of hours which is economically undesirable. A further problem in the processing of copper iron sulfide ores is the simultaneous dissolution of the iron which acts as a contaminant in the copper recovery steps.

In the above-referenced copending application, a process is described whereby chalcopyrite and other copper iron sulfides are reacted with sulfur vapor to form compositions which are highly responsive to leaching. In that process, x-bornite and/or idaite are produced and the latter substances may be leached with chlorides or sulfates to produce copper chlorides or copper sulfates as the case may be. Conventional processing of these copper salts has achieved satisfactory yields of copper metal but the resulting products do not have the desired degree of purity.

SUMMARY OF THE INVENTION

An object of this invention is to recover high grade copper metal from sulfur treated copper ore only by hydrometallurgical processing. Another object of this invention is to recover silver from the ore thereby preventing it from contaminating the copper metal. A further object of this invention is to produce purified copper sulfate as a merchantable product.

In accomplishing the foregoing objects, ore concentrates containing x-bornite or idaite as the main copper-containing material may be prepared by the reaction of copper iron sulfide ore concentrates and sulfur vapor at 460°–500°C. The sulfur treated ore concentrates are leached at 100°–110°C with a solution of cupric chloride saturated with a saline metal chloride at a residence time of 0.5 to 1 hour. The saline metal chloride may be sodium chloride, potassium chloride, magnesium chloride, or any mixture thereof. It is used in the leach solution to prevent premature precipitation of the cuprous chloride.

The resulting pregnant liquor, which contains cupric chloride, cuprous chloride and ferrous chloride, may be cooled and/or diluted with 0 to 1.0 part of water to 1 part of pregnant liquor to crystallize cuprous chloride and silver chloride. By controlling the temperature and dilution ratio, the amount of cuprous chloride and silver chloride precipitated can be controlled. The silver precipitate may be minimized in this way if high purity cuprous chloride is desired. Moreover, if the ore concentrates contain silver in an amount which causes a higher percentage of silver precipitation than desired, cement copper can be added in the leach reactor to maintain it within desired limits. Regardless of the desired purity, it is preferable to precipitate (as CuCl) the amount of copper solubilized in the leach reaction.

The liquor from which the CuCl and some of the AgCl have been precipitated contains NaCl, some CuCl, $CuCl_2$, AgCl, and $FeCl_2$, with the weight ratio of copper to silver being about 1,500. It is necessary to treat this liquor to oxidize the remaining CuCl to $CuCl_2$ and to remove the iron from the system. By using oxygen at slightly elevated pressure and 90°–125°C, the CuCl is oxidized to $CuCl_2$ and $FeCl_2$ is oxidized to the ferric state and precipitated as a ferric basic salt.

The resulting iron free cupric chloride solution may desirably contain about two-thirds of the silver that enters the system with the ore. The trace amount of silver exists in solution as a complex such as $AgCl_2^-$. Since the copper ion exists in the solution as the positive $Cu^{++}$ (as $CuCl_2$) and the silver in the negative complex, $AgCl_2^-$, separation of the two is possible with an anionic exchange resin by adsorption of the $AgCl_2^-$ complex. (Separation of silver chloride and cuprous chloride in the NaCl solution is difficult because both the silver and copper ions exist in the negative radicals, $AgCl_2^-$ and $CuCl_2^-$, respectively.)

Finally, the solution that contains the regenerated $CuCl_2$ and the NaCl is recycled to the leach reactor where the sulfidized ore is reacted with $CuCl_2$ and NaCl.

Alternatively the AgCl is allowed to build up to an equilibrium level in the pregnant liquor from the leach reactor. And upon precipitating the CuCl, AgCl is also precipitated. The amount that precipitates does not have to be controlled as discussed above. The CuCl is then converted to $CuSO_4$ and HCl by reaction with $H_2SO_4$ and oxygen (by contact with air or $O_2$) at 0–50 psig and 100°–115°C. The resulting aqueous solution contains $Cu^{++}$, $SO_4^{--}$, $Cl^-$ and $Ag^+$ from which pure $CuSO_4.5H_2O$ can be crystallized by dropping the temperature or by operating the reaction at a concentration approaching the saturation level of copper sulfate. This copper sulfate is brought into solution and electrolyzed in a conventional cell to produce pure copper metal and sulfuric acid which is recycled to react with CuCl.

Because of the limited solubility of AgCl in the $CuSO_4$-HCl solution from which the $CuSO_4.5H_2O$ is crystallized, the $Ag^+$ concentration will build up to a certain level in a continuous operation and then crystallize out as AgCl with the $CuSO_4.5H_2O$.

By present methods cuprous chloride in chloride solutions may be electrolyzed directly to produce copper metal. A serious disadvantage to this approach is that the impurities in solution such as silver, bismuth, etc. precipitate at the cathode along with the copper. As a result high purity copper cannot be produced by direct electrolysis of chlorides. By converting the solid CuCl to $CuSO_4$, solutions of $CuSO_4$, can be electrolyzed to produce a high grade copper because during electrolysis the impurities deposit at the anode as a sludge.

BRIEF DESCRIPTION OF THE DRAWINGS

In the accompanying drawings.

DESCRIPTION OF PREFERRED EMBODIMENTS

Figure 1:
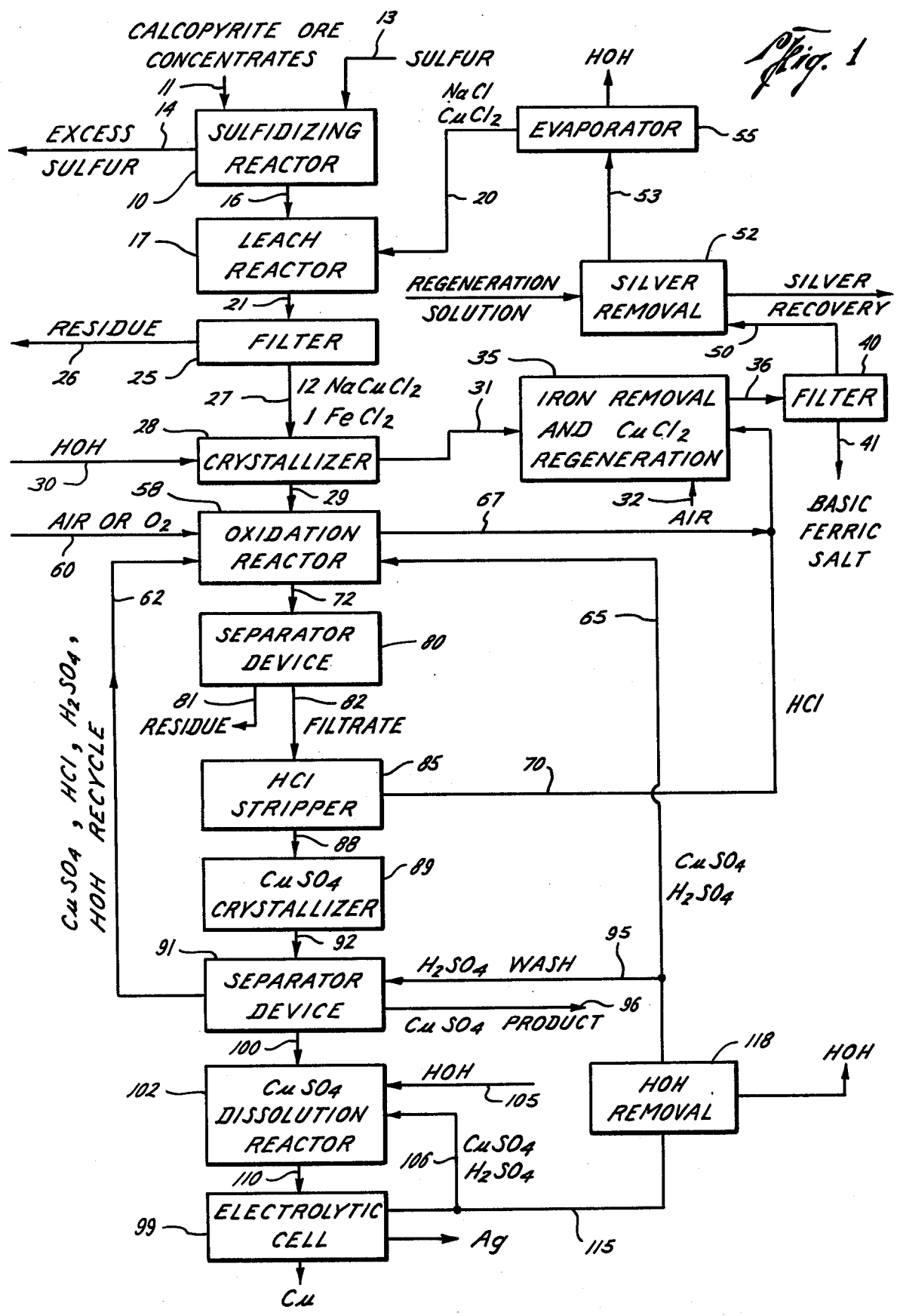
FIG. 1 is a flow sheet of the process of this invention for the production of metallic copper from copper iron sulfide ore concentrates utilizing cupric chloride as the leaching agent.

The reaction of the $CuCl_2$ with the x-bornite is illustrated by the following equation:

$$Cu_5FeS_{4.4} + 7CuCl_2 + 12 NaCl \rightarrow 12NaCuCl_2 + FeCl_2 + 4.4S \quad (1)$$

The reaction of $CuCl_2$ with idaite is as follows:

$$Cu_5FeS_6 + 7CuCl_2 + 12 NaCl \rightarrow 12 NaCuCl_2 + FeCl_2 + 6S \quad (2)$$

Precipitation of CuCl and AgCl from a pregnant liquor containing these compounds may be achieved by dilution with water as follows:

$$12NaCuCl_2 + FeCl_2 \xrightarrow{HOH} 5CuCl\downarrow + 5NaCl + 7NaCuCl_2 + FeCl_2 \quad (3)(a)$$

$$xNaAgCl_2 \xrightarrow{HOH} yAgCl_2\downarrow + (x-y) NaAgCl_2 \quad (b)$$

The relatively pure CuCl is preferably converted to $CuSO_4$ by the following reaction:

$$CuCl + H_2SO_4 + 1/4 O_2 \xrightarrow{H_2SO_4} CuSO_4 + 1/2 H_2O + HCl\uparrow \quad (4)$$

This reaction is carried out in $CuSO_4$—HCl—$H_2SO_4$—$H_2O$ media. It is necessary to remove from the system 1 mole of HCl per mole of CuCl to prevent the chloride ion concentration from building up too high in the liquor from which the $CuSO_4 \cdot 5H_2O$ is crystallized. If the chloride concentration is too high the crystallized $CuSO_4 \cdot 5H_2O$ will contain an excessive amount of chloride. The necessary amount of HCl is removed from the $CuSO_4$—HCl—$H_2SO_4$ aqueous solution by breaking the HCl—$H_2O$ azeotrope with sulfuric acid.

REGENERATION OF $CuCl_2$ AND IRON REMOVAL $$7NaCuCl_2 + FeCl_2 + 2O_2 + 5HCl \rightarrow 7CuCl_2 + H_2O + 7NaCl + Fe(OH)_3 \quad (5)$$

(Basic Ferric Salt)

Silver can also be removed from the cupric chloride-sodium chloride solution which comes from the iron removal reactor by adsorption of the $AgCl_2^-$ complex with an anionic exchange resin.

EXAMPLES OF THE LEACHING REACTION

By this invention 97.0% of the copper can be solubilized in as little as 15 minutes by leaching the sulfidized copper sulfides (x-bornite or idaite) with cupric chloride and NaCl. For the following examples, the copper iron sulfides from the vapor phase reaction between $CuFeS_2$ and S were screened to remove the plus 100 mesh size particles and then leached in a glass reactor at 110°–115°C and atmospheric pressure using one or two stages. Table I below shows: (A) the composition of the copper iron sulfide resulting from the vapor phase sulfidizing of chalcopyrite ore concentrates, (B) results of one stage leaching tests on sulfidized ore, (C) comparative results of one stage leaching test on a chalcopyrite ore, and (D) results of second stage leaching test on the residue from the first stage leach of the sulfidized ore. All of these tests were conducted batchwise.

TABLE I

A.
Composition of the sulfidized Copper Iron Sulfide (S-Ore) and Chalcopyrite (cpy)

| | Chemical Analysis (Wt.%) | | | | X-ray Diffraction Analysis (Approx. Wt.%) |
|---|---|---|---|---|---|
| | Cu | Fe | S | Ag | |
| cpy | 27.63 | 27.14 | 30.6 | 0.019 | 80% cpy and 10% FeS |
| (S-Ore) | 24.24 | 26.42 | 36.6 | 0.016 | 4% cpy, 3% Bornite, 3% Idaite; remainder is x-bornite and pyrite |

B.
One Stage Leaching Tests on Sulfidized Ore per equations 1 and 2 (basis one gram of S-Ore):

| Test No. | Gms $CuCl_2 \cdot H_2O$/ S-Ore | Gms HOH/ S-Ore | Gms NaCl/ S-Ore | Reaction Time (Hours) | Wt.% Solubilized | | |
|---|---|---|---|---|---|---|---|
| | | | | | Cu | Fe | S |
| 1 | 2.25 | 2.25 | 1.5 | 0.25 | 97.3 | 20.3 | 4.6 |
| 2 | 1.88 | 1.88 | 1.25 | 0.5 | 97.3 | 31.2 | 14.7 |
| 3 | 2.25 | 2.25 | 1.5 | 0.5 | 98.1 | 22.4 | 4.8 |
| 4[1] | 2.25 | 2.25 | 1.5 | 0.5 | 98.5 | 22.0 | — |

[1]Test 4 is a repeat of Test 3

TABLE I – Continued

A.
Composition of the sulfidized Copper Iron Sulfide (S-Ore) and Chalcopyrite (cpy)

| Chemical Analysis (Wt.%) | | | | X-ray Diffraction |
|---|---|---|---|---|
| Cu | Fe | S | Ag | Analysis (Approx. Wt.%) |

C.
One Stage Leaching Test on Chalcopyrite Ore
(For this test, the conditions were the same as for Test 3 and 4 above)

| Wt.% Solubilized | | Material Balance (Wt.%) | |
|---|---|---|---|
| Cu | Fe | Cu | Fe |
| 73.6 | 60.5 | 95.6 | 97.3 |

D.
Second Stage Leaching of Sulfidized Ore
The residue containing 1.4% Cu from Test 1 above was leached under the following conditions:

| Gms CuCl$_2$·H$_2$O S-Ore | Gms HOH S-Ore | Gms NaCl S-Ore | Reactor Time (Hours) | Wt.% Solubilized Across 1 Stage | | Wt.% Solubilized Across 2 stages | |
|---|---|---|---|---|---|---|---|
| | | | | Cu | Fe | Cu | Fe |
| 1.88 | 1.88 | 1.25 | 0.5 | 83.0 | 1.5 | 99.2 | 29 |

Table I shows that only 73.6 copper is solubilized when leaching chalcopyrite ore in one stage as compared to 98–98.5% solubilization when leaching sulfidized ore. Moreover, only about 20–30% of the iron in the sulfidized ore was solubilized.

EXAMPLES OF THE CUPROUS CHLORIDE AND SILVER CHLORIDE PRECIPITATION REACTION

The hot pregnant liquor from tests 3 and 4 were divided into a number of equal parts. Some of aliquots were cooled to 35°C, 25°C or to 18°C. Different amounts of water were added to the aliquots at the respective temperatures and equilibrated. The addition of water breaks the NaCuCl$_2$ and NaAgCl$_2$ complexes, thereby precipitating CuCl and AgCl, respectively. Finally, each aliquot was filtered to remove the solid CuCl and AgCl. For these tests, the total amount of silver in the pregnant liquor was the silver derived from the sulfidized ore by CuCl$_2$ and NaCl leaching. Silver content of the pregnant liquor was about 0.0008 to 0.001 wt.%. Results of these tests are given in Table II.

Table II clearly illustrates that the amount of CuCl and AgCl precipitated from the pregnant liquor can be controlled by the degree of cooling and the amount of water added to the pregnant liquor.

TABLE II

Results of the Cuprous Chloride and
Silver Chloride Precipitation Tests (Equation 3)

A. Ag Content of the Pregnant Liquor: 0.0008–0.001 Wt.%
   Cu Content of the Pregnant Liquor: 12.0–14.0 Wt.%

| Temp. (°C) | Gms HOH Added Per Gm of Preg. Liquor | Gms Cu ppt per Gm Cu in S-Ore | Wt.% Cu in CuCl | Gms. of Ag ppt per Gm of Cu ×10$^6$ | Wt.% Fe in CuCl |
|---|---|---|---|---|---|
| 18 | 0.25 | 0.68 | 60.1 | 62 | 0.017 |
| 18 | 0.5 | 0.92 | 58.9 | 93 | 0.007 |
| 18 | 0.75 | 1.19 | 60.5 | 126 | 0.004 |
| 25 | 0.5 | 0.91 | 61.3 | 81.4 | 0.00 |
| 25 | 0.75 | 1.00 | 62.4 | 96.3 | 0.00 |
| 25 | 1.0 | 1.13 | 61.2 | 98.0 | 0.00 |
| 35 | 0.5 | 0.89 | 60.9 | 98.6 | 0.0003 |
| 35 | 0.75 | 0.99 | 63.0 | 95.4 | 0.0002 |
| 35 | 1.0 | 1.19 | 62.1 | 112.6 | 0.0003 |

EXAMPLES OF THE REACTION FOR REGENERATING THE CuCl$_2$ AND REMOVING THE IRON

As set forth in the Atwood and Curtis U.S. Pat. No. 3,785,944, oxygen, either as O$_2$ gas or air may be used in a reaction for regenerating the CuCl$_2$ and removing the iron from the system. Their system, however, contains considerably more iron than the cupric chloride system. For the anionic ion exchange embodiment of the present invention, essentially all of the iron must be removed from the solution prior to silver removal with the ion exchanger since iron interferes.

Below are the results for a number of runs that were carried out batchwise in a titanium autoclave. For all the tests, oxygen gas was bubbled through the solution for a reaction time of 1 hour at a temperature of 125°C. The partial pressure of O$_2$ was 7 psia.

| Input (Grams) | | | Results | | |
|---|---|---|---|---|---|
| Run No. | Cu | Fe | Wt.% Iron Removed | % Cu⁺ Oxidized | Conc. of Fe in liq. wt.% | Wt.% Copper Precipitated |
| 1 | 50.5 | 3.19 | 99.8 | 100 | 0.0005 | 9.8 |
| 2 | 52.71 | 3.33 | 99.8 | 100 | 0.0007 | 17.4 |
| 3 | 51.72 | 2.53 | 99.6 | 100 | 0.0004 | 5.9 |
| 4 | 48.36 | 3.20 | 99.9 | 100 | 0.0004 | 11.0 |

Essentially all the iron was precipitated as basic ferric salts along with 5 to 20% of the copper. In a continuous operation this solid precipitate containing primarily iron and some copper may be re-cycled to the leach reactor to recover the copper content.

SILVER REMOVAL USING ANIONIC EXCHANGE RESINS

In one embodiment of this invention basic ion exchange resins containing tertiary amine functionality on a styrene-divinyl benzene matrix have been found to be suitable for the removal of silver ions from the iron-free liquor discharged from the regeneration step. Such materials may be prepared by the suspension copolymerization of styrene and divinyl benzene to produce a polymer matrix having the desired degree of porosity. Such degree of porosity may be controlled by varying the amount of cross-linking. The amount of cross-linking varies with the amount of the cross-linking agent - divinyl benzene. As the amount of cross-linking agent is decreased the greater the porosity of the polymer beads.

In a typical process, styrene and divinyl benzene are thoroughly mixed and an organic peroxide is dissolved in the mixture. This solution is poured into an equal or larger quantity of water and the suspension is heated until polymerization (an exothermic reaction) begins after which the temperature is controlled by cooling. After the beads of polymer harden, the polymerization is completed by continued heating in the reaction vessel, or the beads may be filtered from the water and the polymerization may be completed by heating in an oven.

The polymerized styrene divinyl benzene beads are then transferred to another vessel where they are treated with chloromethyl ether using a catalyst such as aluminum chloride or zinc chloride. This reaction introduces —CH₂Cl groups on the benzene rings. This product is then aminated with an amine of the general formula R¹RNH where R and R¹ are each an alkyl group. A suitable reactant is, for example, dimethyl amine. After washing with water, the resin is then neutralized to the free base form. The functional sites of this type resin are tertiary amine groups, and a suitable ion exchange resin of this type is available under the trademark AMBERLITE IRA-93 sold by Rohm and Haas.

Other basic ion exchange materials which may be used for removal of silver may be made by following essentially the same process for the production of a copolymer of styrene and divinyl benzene; however, after chloromethylation the product may be aminated with a tri-substituted amine such as, for example, trimethylamine to produce an ion exchange resin having as a functional group the highly ionized quaternary ammonium group:

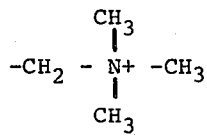

A product of this type which has been found satisfactory is available under the trademark AMBERLITE IRA-400 sold by Rohm and Haas Company. Other suitable Type I basic anionic exchange resins are available under the following brand names or trademarks: DOWEX I, DOWEX II and DOWEX 21K (sold by Dow Chemical Company) and DUOLITE A-42 (sold by the Chemical Process Company).

In the embodiment of this invention in which silver is recovered by contact with an ion exchange resin, the absorbtion of silver may be illustrated by the following chemical equation in which Res represents the ion exchange resin:

$$\text{Res} - \text{OH} + \text{AgCl}_2^- \rightarrow \text{Res} - \text{AgCl}_2 + \text{OH}^-$$

Regeneration of the resin is accomplished by contacting the loaded resin with a basic material such as a solution containing sodium hydroxide, ammonium hydroxide or sodium carbonate. In the practice of this invention, a presently preferred regeneration solution is about 5 to 10 percent ammonium hydroxide at a flow rate of about 0.5 gal/cu ft/min for a total of about 2.4 pounds of ammonium hydroxide per cu. ft. of resin. Since the resin will usually be contaminated with iron, it is desirable that a preliminary flush of about 2.4 lbs. HCl/cu. ft. resin be used to remove the iron from the resin, a flow rate of about 0.5 to 1.0 gal/cu. ft/min. may be used for this purpose.

The regeneration solution releases AgCl₂⁻ from the ion exchange resin as may be illustrated in the following equation:

$$\text{Res} - \text{AgCl}_2 + \text{NH}_4\text{OH} \rightarrow \text{Res} - \text{OH} + \text{Ag}(\text{NH}_4)\text{Cl}_2$$

The silver salt complex in the regeneration solution may be processed to recover silver by an oxidation reduction reaction by employing electrolytic reduction of the silver salt solution or by reacting the salt with an element above silver in the electromotive series. It is presently preferred to precipitate the silver by reacting the silver salt with zinc or aluminum metal.

EXAMPLE NO. 1

For this series of tests a column 66 cm in height with a diameter of 2.4 cm containing 300 cc of Rohm and Haas Amberlite IRA-93 was used. The entire column was heated to 50°C by an exterior water jacket. Aqueous solutions of NaCl, $CuCl_2$, AgCl and $FeCl_3$ were passed through the bed at a flow rate 7–10 cc/min. 4,000 cc of each solution were passed through the bed and then the resin was regenerated with HCl and $NH_4OH$. The next solution was passed through the bed. 1,000cc aliquots were taken for analyses. The results are given below.

The synthetic solutions, A, B, and C, were prepared from reagent grade materials. The actual solution, D, was the liquid product from a previous regeneration example.

TABLE III

Example 1 Results

| Solution | cc's Passed thru Bed | Composition of 1000 cc Aliquots (Wt%) | | | |
|---|---|---|---|---|---|
| | | Cu | Ag | Fe | Na |
| A (Synthetic) | 0 (initial) | 3.5 | 0.00165 | .0074 | 3.01 |
| | 1,000 | 3.20 | 0.00004 | 0.0001 | 3.46 |
| | 2,000 | 3.64 | 0.00008 | 0.00032 | 3.46 |
| | 3,000 | 3.70 | 0.0003 | 0.00054 | — |
| | 4,000 | 3.77 | 0.00074 | 0.00070 | — |
| B (Synthetic) | 0 (initial) | 3.32 | 0.0010 | 0.00062 | 2.72 |
| | 1,000 | 3.23 | 0.00025 | 0.00009 | 3.69 |
| | 2,000 | 3.29 | 0.00028 | 0.00025 | 2.61 |
| | 3,000 | 3.55 | 0.00050 | 0.00043 | 3.06 |
| | 4,000 | 3.65 | 0.00068 | 0.00083 | 3.18 |
| C (Synthetic) | 0 (initial) | 3.84 | 0.00115 | 0.00051 | 3.09 |
| | 1,000 | 3.22 | 0.00005 | 0.00008 | 3.09 |
| | 2,000 | 3.94 | 0.00015 | 0.00024 | 2.98 |
| | 3,000 | 3.85 | 0.00065 | 0.00036 | 2.96 |
| | 4,000 | 4.00 | 0.00070 | 0.00112 | 2.70 |
| D (Actual Solution) | 0 (initial) | 3.18 | 0.00090 | 0.014 | 2.12 |
| | 1,200 | 2.99 | 0.00002 | 0.012 | 2.43 |

EXAMPLE NO. 2

For these tests we used a 1.3 cm diameter column, 2 feet high filled with 91 cc of Amberlite IRA-93. The tests conducted at room temperature (25°C) using synthetic aqueous solutions of NaCl, $CuCl_2$, AgCl and $FeCl_3$ at a feed rate of 77 cc/min. 500 cc aliquots were taken for analysis. The bed was regenerated with HCl and $NH_4OH$ after 2,000 cc of each solution was passed through the bed. Below are the results.

TABLE IV

| Solution | cc's of Solution Passed thru Bed | Composition of 500 cc Aliquot (Wt.%) | | | |
|---|---|---|---|---|---|
| | | Cu | Ag | Fe | Na |
| E (Synthetic) | 0 (initial) | 4.42 | 0.0016 | 0.0005 | 2.83 |
| | 500 | 3.88 | 0.00009 | 0.0002 | 2.79 |
| | 1,000 | 4.29 | 0.00059 | 0.0004 | 2.68 |
| | 1,500 | 4.50 | 0.0010 | 0.0004 | 3.36 |
| | 2,000 | 4.38 | 0.0014 | 0.0005 | 3.23 |
| F (Synthetic) | 0 (initial) | 4.54 | 0.0015 | 0.00043 | 3.38 |
| | 500 | 3.97 | 0.00008 | 0.00020 | 3.36 |
| | 1,000 | 4.53 | 0.00053 | 0.00037 | 2.87 |
| | 1,500 | 4.67 | 0.00104 | 0.00039 | 3.49 |
| | 2,000 | 4.64 | 0.00133 | 0.0005 | 3.30 |

EXAMPLE NO. 3

For this example, Rohm and Haas Amberlite IRA-400 (a strongly basic, Type I, quaternary ammonium anion exchange resin of standard porosity) was used to remove the silver. The results follow:

The technique for the tests of this example was the same as that for Example No. 2.

TABLE V

| Solution | cc's of Solution Passed thru Bed | Composition of 500 cc Aliquot (Wt.%) | | | |
|---|---|---|---|---|---|
| | | Cu | Ag | Fe | Na |
| G (Synthetic) | 0 (initial) | 4.54 | 0.00015 | 0.00043 | 3.38 |
| | 500 | 3.96 | 0.00005 | 0.00026 | 3.52 |
| | 1,000 | 4.80 | 0.00051 | 0.00033 | 3.49 |
| | 1,500 | 4.68 | 0.00092 | 0.00035 | 3.31 |
| | 2,000 | 4.79 | 0.00132 | 0.00048 | 3.14 |
| H (Synthetic) | 0 (initial) | 5.67 | 0.00191 | 0.00046 | 3.18 |
| | 500 | 5.12 | 0.00011 | 0.00027 | 3.04 |
| | 1,000 | 5.67 | 0.00085 | 0.00039 | 2.93 |
| | 1,500 | 5.70 | 0.00151 | 0.00048 | 2.99 |
| | 2,000 | 5.31 | 0.0016 | 0.00083 | 2.18 |

EXAMPLES OF THE METHOD OF PREPARING CUSO₄

A series of batch tests was made in an aqueous solution of $HCl-CuSO_4-H_2SO_4$ to simulate recycling of the mother liquor from the crystallization step to the $CuCl-H_2SO_4-O_2$ reaction step of Equation 4. In the first step of this series the CuCl, $H_2SO_4$ and $O_2$ were reacted in an aqueous media of $HCl-CuSO_4-H_2SO_4$ in an autoclave at 40 psig. (A NaOH trap was put on the exit line to trap any HCl given off during the reaction.) Secondly, the resulting $HCl-CuSO_4-H_2SO_4$ rich in $CuSO_4$ and HCl was distilled to remove at least 1 mole of HCl per mole of CuCl input. In the third step the solution was cooled to crystallize 1 mole of $CuSO_4$ per mole of CuCl input. The conditions and results of these runs are in Table VI.

TABLE VI

Step I: Reaction of one mole of CuCl with four moles of $H_2SO_4$ in a $CuSO_4$-$H_2SO_4$-HCl media.
Conditions: Temp (°C) — 105
Tot. Pressure (psig) — 40
Reaction Time (min.) — 20

| | Ag | Cu | Cl | Input (Gms) HOH | Total Component Wt. |
|---|---|---|---|---|---|
| 97.5% $H_2SO_4$ | | — | — | | 240 |
| CuCl | 0.0009 | 36.7 | 21.6 | | 61 |
| $CuSO_4$ —$H_2SO_4$— 38% HCl Media | | 73.8 | 66.0 | 350 | 703 |
| Total | 0.0009 | 110.5 | 87.6 | 350 | 1004* |

| | Ag | Cu | Output (Gms) Cl | Total Component |
|---|---|---|---|---|
| Filtrate | 0 | 96.1 | 54.5 | 1375 |
| Residue | 0.0009 | 11.2 | 6.5 | 20.5 |
| NaOH Trap | 0 | 0 | 11.8 | — |
| Total | 0.0009 | 107.3 | 72.8⁽¹⁾ | 1395.5* |

Step II: Distillation of HCl-HOH to remove at least 1 mole of HCl per mole of CuCl (liquid 120–135°C; vapor 110°C.).

| | Ag | Cu | Input (Gms) Cl | Total Component |
|---|---|---|---|---|
| Feed | 0.0005 | 79.4 | 24.0 | 1040 |

| | Ag | Cu | Output (Gms) Cl | HOH | Total Component |
|---|---|---|---|---|---|
| Distillate | | | 13.0 | | 130 |
| Pot Liquid | 0.0005 | 78.1 | 8.7 | | 895 |
| Total | 0.0005 | 78.1 | 21.7⁽¹⁾ | | 1025 |

Step III: Crystallization of Copper Sulfate
Conditions: Temp (°C) — 70
Retention Time (min) — 120

| | Cu | Input (Gms) Cl | Total Component Wt. |
|---|---|---|---|
| Feed Soln. | 78.1 | 8.70 | 1012* |

| | Cu | Output (Gms) Cl | Total Component Wt. |
|---|---|---|---|
| Filtrate | 45.2 | 6.21 | 928 |
| Crystallization Product | 30.2 | 0.11 | 99.6 |
| Total | 75.4 | 6.32 | 1027.6* |

⁽¹⁾The poor material balances from Cl is probably due to the evolution of HCl while processing the components from each step.

A second series of batch tests was made in an aqueous solution of $HCl-CuSO_4-H_2SO_4$ at atmospheric pressure. The procedure of carrying out the reaction with oxygen and sulfuric acid was the same as for that for the above series except for the total pressure and reaction time during the first step. Results of this reaction is shown in Table VII.

TABLE VII

Step I: Reaction of one mole of CuCl with one mole of $H_2SO_4$ in a $CuSO_4$-$H_2SO_4$-HCl media.
Conditions: Temp (°C) — 105
Total Pressure — Atomspheric
Reaction Time (Min) — 60

| Input (Gms) | Cu | Cl | Total Component Wt. |
|---|---|---|---|
| 96% $H_2SO_4$ | | | 38 |
| CuCl | 22.8 | 13.4 | 38 |
| $CuSO_4$-$H_2SO_4$- 38% HCl Media | 41.3 | 41.2 | 636 |
| Total | 64.1 | 54.6 | 712* |
| Output | | | |
| Filtrate | 64.3 | 51.3 | 894 |
| Residue | — | — | Nil |
| NaOH Trap | 0 | 1.0 | — |
| Total | 64.3 | 52.3 | 894* |

It has been found that the three steps of reaction, HCl removal and $CuSO_4$ crystallization (all as generally indicated by Equation 4) may be combined into one step. CuCl, $H_2SO_4$ and $O_2$ were reacted at 120°C for 60 minutes, followed by nitrogen purge for 90 minutes to remove HCl. (Solid material was present throughout the entire 90 minutes.) Then the slurry was filtered at 100°–120°C to remove the solid copper sulfate and the solid was washed with a small amount of water. Test results of the combined process are set forth below in Table VIII.

TABLE VIII

Step I: Reaction of one mole of CuCl with one mole of $H_2SO_4$ in a $CuSO_3$-$H_2SO_4$-HCl media
Conditions: Temp (°C) — 120
Total Pressure — Atmospheric
Reaction Time (Min) — 60
Time of Nitrogen Flush (Min) — 90

| Input (Gms) | Cu | Cl | Total Component Wt. |
|---|---|---|---|
| 96% $H_2SO_4$ | | | 38 |
| CuCl | 22.8 | 13.4 | 38 |
| $CuSO_4$-$H_2SO_4$-38% HCl Media | 41.3 | 41.2 | 636 |
| Total | 64.1 | 54.6 | 712* |

| Output | Cu | Cl | Total Component Wt. |
|---|---|---|---|
| Filtrate | 37.8 | 21.2 | 727 |
| Cake Produce | 24.1 | 0.1 | 61.7 |
| NaOH Trap | 0 | 15.5 | — |
| Total | 61.9 | 36.8 | 788.7* |

*In the above Tables VI, VII and VIII, the apparent increase in the weight of the output components in Steps 1 and 3 was due to wash water retained in the filtrate.

FIG. 1 is a schematic diagram of the proposed continuous process to produce copper from a copper iron sulfide ore concentrate containing chalcopyrite.

In the sulfidizing of copper iron sulfide ore concentrates, such as chalcopyrite ore, the ore concentrates are added to the sulfidizing reactor 10 through line 11. Molten sulfur is introduced into reactor 10 through line 13 wherein it is vaporized before being mixed with the ore concentrates. The vaporized sulfur is preferably maintained at a partial pressure of at least about 200 mm of Hg. In the reactor the ore concentrates are sulfidized in as little as six minutes at a temperature of about 470°C, thereby converting most of the chalcopyrite content of the ore concentrates to x-bornite and pyrite. Excess sulfur is discharged through line 14. The sulfidized ore from reactor 10 is then passed through line 16 to leach reactor 17 into which is also passed cupric chloride and sodium chloride solution through line 20.

Copper leaching is conducted in leach reactor 17 at 110°–115°C at atmospheric pressure over a period of 0.5 to 1 hour. After the reaction is completed, the hot slurry passes from the leach reactor through line 21 to a separation device such as filter 25 where the pregnant liquor is separated from the residue. The residue which contains the unreacted pyrite, sulfur and other insolubles leave the separation device through line 26 and the pregnant solution leaves the device through line 27 and enters the crystallizer 28 which is maintained at 10°–40°C and has a retention time of 30 minutes to 4 hours. A controlled amount of water from line 30 is introduced to the crystallizer to effect the desired amount of crystallization of the CuCl which leaves the crystallizer through line 29. The resulting lean solution is removed from the crystallizer to the Iron Removal and $CuCl_2$ Regeneration Reactor through line 31. Through line 32 oxygen or air enter the reactor 35 which is maintained at 90°–125°C and a total pressure of 70–100 psig for 30 minutes to 4 hours. The resulting slurry leaves the reactor by line 36 and separation of the insoluble basic ferric salts from solution takes place in a separation device such as a centrifuge or filter 40. The insolubles leave the device through line 41 and the solution may be passed through line 50 to the anionic exchange resin columns 52 where silver may be extracted from the solution if desired. The solution then passes through line 53 to an evaporator 55 to remove excess water to maintain an adequate water balance in the system. Finally, the regenerated $CuCl_2$—NaCl aqueous solution is added to the leach reactor through line 20.

The solid CuCl with some AgCl contamination enters the oxidation reactor 58 through line 29 along with air or oxygen from line 60 and recycle aqueous solution of $CuSO_4$—HCl—$H_2SO_4$ from line 62. One mole of $H_2SO_4$ recycled from the electrolytic cell enters the reactor from line 65. In this reactor the CuCl is converted to $CuSO_4$ at 95°–110°C, 0–50 psig and a contact time of 15–30 minutes. Any HCl gas that is evolved leaves the reactor through 67 and is recycled to the leach reaction system along with HCl from line 70. The hot slurry leaves the reactor through line 72 and is passed through the separation device 80. Residue which leaves the separation device 80 through line 81 may contain some unreacted CuCl and AgCl and is recycled to the leach system or processed to extract the silver.

The solution from the separation device goes through line 82 to the HCl stripper 85 where the remainder of one mole of HCl is removed. Any water in the HCl is recycled with the HCl through line 70 and subsequently removed in the leach system. Water is added to the oxidation reactor to make up the amount removed with the HCl.

Product from the HCl stripper goes through line 88 to the $CuSO_4$ crystallizer 89 where $CuSO_4 \cdot 5H_2O$ is crystallized. Crystallization takes place at 40°–70°C at a resident time of 30 minutes – 3 hours. The resulting slurry is transferred to a filter or other suitable separation device 91 by line 92. The filtrate from the filter 91 which contains some $CuSO_4$ with HCl, $H_2SO_4$ and water is recycled through line 62 back to the oxidation reactor 58. The solid CuSO$_4$ . 5H$_2$O is washed with a H$_2$SO$_4$ solution which is taken by line 95 from recycle line 65. This wash solution removes excess chloride from the cake and it is recycled through line 62 to the oxidation reactor 58.

The solid CuSO$_4$ . 5H$_2$O may be removed through discharge conduit 96 as a merchandisable grade of CuSO$_4$ . 5H$_2$O. In the alternative the CuSO$_4$ . 5H$_2$O may be fed through conduit 100 into a vessel or dissolution reactor 102 where it is dissolved by make-up water which enters the vessel through line 105 and a recycle aqueous solution of H$_2$SO$_4$—CuSO$_4$ entering the vessel through line 106.

The rich CuSO$_4$ solution is passed through line 110 to a conventional electrolytic cell 99 where it is electrolyzed to produce pure copper at the cathode and silver in the anode sludge. Part of the recycle CuSO$_4$ . H$_2$SO$_4$ is passed through line 106 to dissolve the solid CuSO$_4$ and the other part is conveyed through line 115 to evaporator 118 where it is concentrated and recycled through line 65 to the oxidation reactor.

Figure 2:
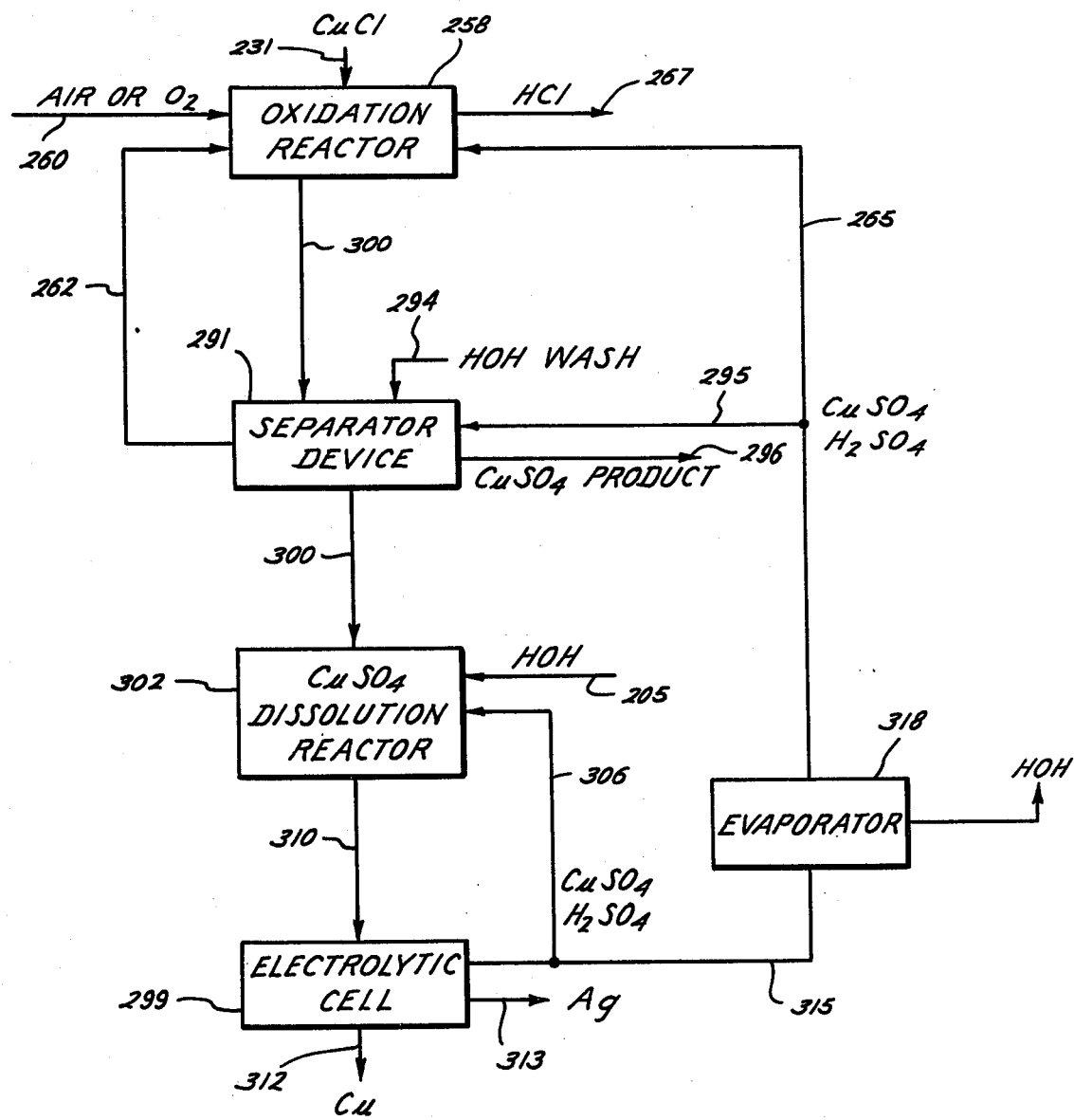
FIG. 2 is a flow sheet of a subcombination process of this invention illustrating an alternate method of processing cuprous chloride for the production of metallic copper.

The embodiment of the invention illustrated in FIG. 2 shows a useful subcombination of the process wherein cuprous chloride may be processed to produce CuSO$_4$ . 5H$_2$O and/or metallic copper. One suitable method of making cuprous chloride has been heretofore described. Other processes are available for the production of cuprous chloride precipitate from copper ore. For example, a cuprous chloride precipitate may be produced by leaching pyrite ore containing copper with dilute acids and precipitating cuprous chloride from the leach liquor by treating it with cement copper as taught in British Pat. Specification No. 260,294, dated June 2, 1927.

FIG. 2 further illustrates a variation of the present invention in which the formation of copper sulfate, hydrochloric acid removal, and copper sulfate crystallization are all conducted in a single reaction vessel.

In the embodiment of FIG. 2, cuprous chloride is introduced into the oxidation reactor 258 through conduit 231. Oxygen is introduced by suitable means such as oxygen gas or air passed through line 260 and sulfuric acid is introduced through line 265. In this reactor the CuCl is converted to CuSO$_4$ at 95°–130°C, 0–50 psig and a contact time of 30 minutes to 2 hours. Hydrogen chloride evolved from the reaction is conveyed from the reactor through line 267 to be available as a leach agent, or to be recovered as a byproduct. The copper sulfate slurry discharged from the oxidation reactor comprises copper sulfate, hydrochloric acid and sulfuric acid. It is conveyed through line 300 to the separator device 291 which may be any suitable filter, centrifuge or the like.

The copper sulfate cake or residue in separator 291 is washed with a sulfuric acid-copper sulfate solution conveyed from the electrolytic cell 299 through line 315, evaporator 318, and lines 265 and 295. After the sulfuric acid wash the copper sulfate crystals may be further washed with a small amount of water through line 294 and a merchandisable grade of copper sulfate, commonly known as blue vitriol, may be removed through conduit 296.

In the alternative, the copper sulfate from separator 291 may be conveyed through line 300 to the dissolution reactor 302 where it is dissolved by water which enters the vessel through line 205, and by recycled aqueous solution of H$_2$SO$_4$—CuSO$_4$ from electrolytic cell 299. The dissolved copper sulfate solution is conveyed into electrolytic cell 299 through line 310 where it is electrolyzed to product pure copper at the cathode and silver in the anode sludge. These products may be removed from the electrolytic cell through suitable discharge conduits or conveyor means such as copper product line 312 and silver product line 313.

Recycled electrolyte containing copper sulfate and sulfuric acid are passed through line 315 from which a portion is conveyed through line 306 to the dissolution reactor. Another portion of the recycle from the electrolytic cell is conveyed through evaporator line 318 to line 265 from which a part is conveyed through line 295 into separator device 291 where it is used to wash the copper sulfate crystals. The remainder of the recycle sulfuric acid from the electrolytic cell is conveyed by line 265 to the oxidation reactor. Washwater from separator device 291, containing copper sulfate, hydrochloric acid, sulfuric acid and water is also conveyed through line 262 to the oxidation reactor.

As previously noted, the ion exchange columns indicated at numeral 52 of FIG. 1 may be omitted in the practice of the present invention since the purified cuprous chloride is converted to copper sulfate in the oxidation reactor 58 or 258. When the ion exchange unit 52 is omitted, silver will be permitted to build up in the filtrate recycled from crystallizer 28 to the leach reactor. The silver chloride is thus permitted to build up until its concentration is such that it will precipitate with the cuprous chloride in the crystallizer 28.

This embodiment, the silver chloride passes through the oxidation reactor and is crystallized out with the copper sulfate. It will be understood that in this process the amount of silver chloride that is precipitated does not have to be controlled since the separation of silver chloride from a copper sulfate solution may be readily effected in the electrolytic cell. In the electrolysis of a copper sulfate-silver chloride solution the copper is deposited at the cathode and the silver is precipitated with the anodic sludge. Thus a high purity copper may be obtained without regard to the silver content of the electrolyte.

It has been found that the present invention provides an economical means of producing high purity copper. By the use of a cupric chloride as a leaching agent a faster leach reaction may be achieved than the equivalent sulfate leach system, and lower pressures may be used. There is less formation of sulfates during chloride leaching, and the leaching process is more selective in that less iron and sulfur are leached with the copper in the ore. Moreover, the conversion of the relatively pure cuprous chloride cyrstals to copper sulfate as further taught by this invention has the advantage that a copper sulfate electrolyte may be electrolyzed to produce copper of higher purity than can be produced from a copper chloride electrolyte having the same level of contamination.

I claim:

1. In a process for the production of metallic copper from copper iron sulfide ore concentrates containing chalcopyrite in which the ore concentrates are first reacted with sulfur vapor to form a sulfur-treated concentrate containing a member from the class consisting of x-bornite, idaite and mixtures thereof, the improved hydrometallurgical process comprising:

a. Leaching said sulfur treated concentrate with cupric chloride to achieve substantial solubilization of the copper content of the ore concentrate, thereby forming a leached solution containing cuprous chloride;

b. Crystallizing cuprous chloride from said leach solution and separating the cuprous chloride crystals therefrom;

c. Reacting said cuprous chloride crystals with sulfuric acid and oxygen to produce copper sulfate crystals;

d. Separating said crystals from the copper sulfate liquor;

e. Dissolving the separated copper sulfate crystals in a sulfuric acid media; and f. Electrolyzing the resulting copper sulfate solution to produce metallic copper at the cathode.

2. The method according to claim 1 wherein said sulfur treated ore concentrate consists primarily of x-bornite.

3. The method according to claim 1 wherein said sulfur treated ore concentrate consists primarily of idaite.

4. The method according to claim 1 wherein said sulfur treated concentrate is leached at a temperature in the range from about 100°C to about 110°C for such period of time as to achieve substantial solubilization of the copper content of the ore concentrates.

5. The method according to claim 1 wherein a saline metal chloride selected from the group consisting of sodium chloride, potassium chloride, magnesium chloride and mixtures thereof is maintained present during the leaching step at a concentration sufficient to avoid precipitation of cuprous chloride during said leaching step.

6. The process of claim 1 wherein the lean leach solution filtrate remaining after separation of crystals of cuprous chloride is reacted with oxygen to precipitate the iron content as insoluble basic ferric salt; said basic ferric salt is separated from the filtrate; and the resulting iron free filtrate is contacted with an ion exchange resin containing a styrene-divinyl benzene matrix having functional sites provided by chemical groups selected from the groups consisting of tertiary amines and quaternary ammonium groups to remove silver ions from said filtrate.

7. The process of claim 1 wherein the amount of copper in the cuprous chloride crystallized out of the leach solution is equal to the copper content of the solubilized sulfur-treated ore concentrate.

8. The process of claim 1 wherein the leach solution is reacted with oxygen to regenerate cupric chloride and to precipitate iron as basic iron salts; absorbing silver chloride salts from the resulting substantially iron free solution by contact with a basic synthetic resin having a styrene-divinyl benzene matrix and further having functional sites provided by functionally active ion exchange groups selected from chemical groups consisting of tertiary amines and quaternary ammonium groups; recovering the silver content therefrom by regenerating the ion exchange material with a basic solution to produce a solution containing silver ions; and recycling the regenerated cupric chloride solution to the leaching step.

9. The process of claim 1 wherein the cuprous chloride in step (b) is crystallized from the leach solution at 18°–35°C and 0–1.0 part of water is added for one part of leach solution.

10. The process of claim 1 wherein the reaction of step (c) is conducted at a ratio of 1 mole CuCl with 1 mole of $H_2SO_4$ at about 95°–130°C for about 30 minutes to 2 hours to produce a solution containing solid copper sulfate crystals.

11. In a process for the production of metallic copper from copper iron sulfide ore concentrates containing chalcopyrite in which the ore concentrates are first reacted with sulfur vapor to form a sulfur-treated concentrate containing a member from the class consisting of x-bornite, idaite and mixtures thereof, the improved hydrometallurgical process comprising:

a. Leaching said sulfur treated concentrate with cupric chloride to achieve substantial solubilization of the copper content of the ore concentrate, thereby forming a leached solution containing cuprous chloride;

b. Crystallizing cuprous chloride from said leach solution and separating the cuprous chloride crystals therefrom;

c. Reacting said cuprous chloride crystals with sulfuric acid and oxygen to produce a copper sulfate solution;

d. Crystallizing copper sulfate from said copper sulfate solution at 40°–70°C for 30 min. to 3 hours;

e. Separating said copper sulfate from the resulting lean copper sulfate solution;

f. Dissolving the separated copper sulfate crystals in a sulfuric acid media; and g. Electrolyzing the resulting copper solfate solution to produce metallic copper at the cathode.

12. The process of claim 11 wherein the reaction of step (e) is conducted with approximately 1 mole of CuCl and 4 moles of $H_2SO_4$ in a $CuSO_4$—$H_2SO_4$—HCl media at about 95°–110°C for about 15 to 30 minutes.

13. The process of claim 11 wherein said copper sulfate solution of step (e) is distilled at a liquid temperature of about 120°–135°C for sufficient time to remove about 1 mole of HCl for each mole of cuprous chloride entering the reaction step (e).

14. In a process for the production of metallic copper from copper iron sulfide ore concentrates containing primarily chalcopyrite ore in which the ore concentrates are reacted with sulfur vapor to form a sulfur-treated concentrate containing as the principal copper-containing material therein a member from the class consisting of x-bornite, idaite and mixtures thereof, the improvement comprising:

a. Leaching said sulfur treated concentrate with cupric chloride to achieve substantial solubilization of the copper content of the ore concentrate, thereby forming a leached solution containing cuprous chloride;

b. Crystallizing cuprous chloride from said leach solution and separating the cuprous chloride crystals therefrom;

c. Reacting said cuprous chloride crystals with sulfuric acid and oxygen to produce a cupric sulfate solution.

d. Crystallizing cupric sulfate from said solution and separating the cupric sulfate crystals from said solution.

15. A process for the production of metallic copper from cuprous chloride comprising the steps of:

a. Reacting said cuprous chloride with sulfuric acid and oxygen to produce a copper sulfate solution;

b. Crystallizing said copper sulfate from said solution and removing the resulting crystals therefrom;

c. Dissolving the copper sulfate crystals in a water and sulfuric acid media; and d. Electrolyzing said copper sulfate solution to produce copper metal at the cathode.

16. The process of claim 15 wherein the crystallization of copper sulfate in step (b) is conducted at about 40°–70°C temperature, and for about 30 minutes to 3 hours.

17. A process for the production of metallic copper from cuprous chloride comprising the steps of:
a. Reacting said cuprous chloride with sulfuric acid and oxygen at a ratio of about 1 mole of cuprous chloride and 1 mole of sulfuric acid in the presence of oxygen to produce copper sulfate crystals;
b. Separating said copper sulfate crystals from said solution;
c. Dissolving the copper sulfate crystals in a water and sulfuric acid media; and
d. Electrolyzing said copper sulfate solution to produce copper metal.

18. The process of claim 17 wherein said crystallization of copper sulfate in step (b) is conducted at about 95° to 130°C for about 30 minutes to 2 hours.

19. The process of claim 15 wherein the solubilization of copper sulfate crystals in step (c) is conducted at about 30°–60°C for about 15 minutes to 2 hours; said water being added in an amount from 0–1.0 lb. water per pound of $CuSO_4$ and said sulfuric acid being added as a 1–5% sulfuric acid solution in an amount ranging from about 5 to 10 lbs. of said sulfuric acid solution per pound of $CuSO_4$.

20. The process of claim 17 wherein the solubilization of copper sulfate crystals in step (c) is conducted at about 30°–60°C for about 15 minutes to about 2 hours; said water being added in an amount from 0–1.0 lb. water per pound of $CuSO_4$ and said sulfuric acid being added as a 1–5% sulfuric acid aqueous solution in an amount ranging from about 5 to 10 pounds of said sulfuric acid solution for 1 pound of $CuSO_4$.

* * * * *

UNITED STATES PATENT OFFICE
CERTIFICATE OF CORRECTION

Patent No. 3,880,732          Dated April 29, 1975

Inventor(s) John B. Sardisco

It is certified that error appears in the above-identified patent and that said Letters Patent are hereby corrected as shown below:

Col. 1, line 53, "only" should be deleted

Table II, Col. 6, fourth heading, "Cucl" should be -- CuCl --

Table III, Col. 9, first numeral in fourth column, ".0074" should be -- 0.0074 --

Table III, Col. 9, second column, first line after "C", "3,84" should be -- 3.84 --

Col. 13, Table VII, "Atomspheric" should be -- Atmospheric --

Col. 16, line 4, "product" should be -- produce --

Col. 16, line 13, delete the word "line" before the numeral 318

Col. 18, line 31, "solfate" should be -- sulfate --

Signed and Sealed this second Day of September 1975

[SEAL]

Attest:

RUTH C. MASON
Attesting Officer

C. MARSHALL DANN
Commissioner of Patents and Trademarks